Patented Aug. 30, 1932

1,874,546

UNITED STATES PATENT OFFICE

ERICH KONRAD AND WERNER SIEFKEN, OF COLOGNE-MULHEIM-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE COAGULATION OF LATEX LIKE EMULSIONS TO RUBBER LIKE MASSES

No Drawing. Application filed January 4, 1929, Serial No. 330,426, and in Germany January 16, 1928.

The present invention relates to a process of coagulating latex-like emulsions to rubber-like masses by causing the emulsions to freeze out.

Several methods for the manufacture of artificial rubber-like masses have already been the subject of patent applications, by which methods the starting hydrocarbons, such as butadiene-(1.3), isoprene, 2.3-dimethyl butadiene-(1.3) and other homologues and analogues of butadiene-(1.3), are emulsified in water in the presence of emulsifying agents, such as soaps, alkali metal salts of bile acids and the like, and polymerized in this emulsion. By these processes there are frequently obtained latex-like emulsions, from which the artificial rubber-like masses must be obtained by coagulation.

These latex-like emulsions can be coagulated, it is true, by analogous methods to those used with natural rubber latex, for example, by means of acids. According to the present invention, however, a separation of the aqueous emulsifying solution and the dispersed hydrocarbon is effected simply by cooling the latex-like emulsions below the freezing point of the emulsion at least until the whole mass has frozen. This process will be designated hereinafter as "freezing out". The aqueous layer containing the emulsifying agent can then be separated from the coagulate by subsequent thawing.

This method has the great advantage that the recovery of the emulsifying agent is rendered possible in the simplest and cheapest manner. Provided that the latex-like emulsion is not diluted prior to the freezing out, the aqueous layer containing the emulsifying agent can be directly used again for emulsifying and polymerizing a fresh quantity of hydrocarbon. Moreover the acid which would otherwise be necessary is saved, which is all the more important, since the coagulation of some latex-like emulsions requires considerable quantities of acid.

A further technical advance of our coagulation process is, that, after having separated the aqueous layer containing the emulsifying agent, the coagulate, after the washing and drawing, can be used for vulcanizing purposes without any further cleaning, whereas, when causing coagulation according to other methods, for instance by acidifying the latex-like emulsions, the coagulates will be contaminated with impurities derived from the emulsifying agents used, which impurities are very difficult to remove and will, if present, impair the vulcanizing process as well as the vulcanizates obtainable thereby.

The duration and degree of cooling may vary in wide limits, mainly depending on the kind of the emulsifying agent used.

In some particular cases it has been found, that the complete removal and recovery of the emulsifying agent is rendered difficult or occasionally impossible, that is to say, when the latex-like emulsions contain any unchanged diolefine. In such a case the emulsifying agent may be absorbed so firmly on to the particles of the emulsion containing rubber and the unchanged diolefine, that it can only be removed incompletely even by repeated washing. This phenomenon seems to appear especially, when a colloidal emulsifying agent has been used, as for example, aqueous soap solution. When this happens, the complete recovery and removal of the emulsifying agent can be effected by removing the unchanged diolefine by evaporation or vaporization either before or after cooling the emulsion. The evaporation can be effected in various ways, for example, by passing an indifferent gas through the latex or by rolling the coagulate. Vaporization can also be effected by any desired method, as for example, by simple heating or by recourse to reduced pressure.

The following examples will illustrate our invention without limiting it thereto, the parts being by weight.

Example 1

To 100 parts of an aqueous 10% sodium oleate solution, 60 parts of butadiene-(1.3) and 5 parts of 1N NaOH are added and this mixture is shaken in a closed vessel until an emulsion has formed and is then heated to 60° C. for about 3 days, while continually shaking. After that time 50% of the butadiene -(1.3) will be polymerized in the form of a latex-like emulsion, which latter is coagulated by cooling the emulsion to −15° C. for about 3 hours. When thawing, the unchanged butadiene will vaporize. After that, the coagulate is pressed off and washed, until the adhering sodium oleate is removed.

Example 2

100 parts of isoprene are emulgated in 150 parts of a 5% aqueous sodium desoxycholate solution and this emulsion is heated to 60–70° C. for about 2 days while shaking. The latex-like emulsion thus obtained is freed from unchanged isoprene by steam distillation, after which the emulsion is cooled to about −20° C. until the whole mass has solidified. After thawing, the coagulate is isolated and washed with water.

Example 3

100 parts of 2.3-dimethyl butadiene-(1.3) are emulgated with 120 parts of a warm aqueous sodium stearate solution of 8% strength and this emulsion is heated to 70° C. for about 10 days while continually shaking. In a nearly quantitative yield a polymerizate of cream-like consistency is thus obtained which is diluted with the same quantity of warm water while stirring and then cooled to about −15° C. for 4 hours. After thawing, the coagulate is separated and washed with warm water.

We claim:

1. A process of manufacturing rubber-like masses which comprises polymerizing a compound of the group consisting of butadiene-(1.3) and its methyl substitution products in the presence of water and of an emulsifying agent and then coagulating the latex-like emulsions thus obtained by freezing out.

2. A process of manufacturing rubber-like masses which comprises polymerizing a compound of the group consisting of butadiene-(1.3), isoprene and 2.3-dimethyl-butadiene-(1.3) in the presence of water and of an emulsifying agent and then coagulating the latex-like emulsions thus obtained by freezing out.

3. A process of manufacturing rubber-like masses which comprises polymerizing a compound of the group consisting of butadiene-(1.3) and its methyl substitution products in the presence of water and of an emulsifying agent, coagulating the latex-like emulsions thus obtained by freezing out and removing any unpolymerized hydrocarbon by vaporization.

4. A process of manufacturing rubber-like masses which comprises polymerizing a compound of the group consisting of butadiene-(1.3), isoprene and 2.3-dimethyl-butadiene-(1.3) in the presence of water and of an emulsifying agent, coagulating the latex-like emulsions thus obtained by freezing out and removing any unpolymerized hydrocarbon by vaporization.

In testimony whereof we have hereunto set our hands.

ERICH KONRAD.
WERNER SIEFKEN.